United States Patent [19]
Weil

[11] 3,893,015
[45] July 1, 1975

[54] FORCED VOLTAGE SHARING IN SERIES-CONNECTED POWER INVERTERS

[75] Inventor: Thomas A. Weil, Wellesley, Mass.

[73] Assignee: Raytheon Company, Lexington, Mass.

[22] Filed: Jan. 3, 1975

[21] Appl. No.: 538,282

[52] U.S. Cl. .............. 321/27 R; 307/6; 307/82; 321/45 R
[51] Int. Cl.² .................................. H02M 7/00
[58] Field of Search ........ 307/6, 57, 71, 82; 321/27, 321/27 MS, 45 R

[56] References Cited
UNITED STATES PATENTS

| | | | |
|---|---|---|---|
| 3,010,062 | 11/1961 | Van Emden | 321/45 R X |
| 3,230,382 | 1/1966 | Burns et al. | 307/82 X |
| 3,293,530 | 12/1966 | Baude | 321/18 X |
| 3,328,664 | 6/1967 | Baude | 321/27 MS |
| 3,573,597 | 4/1971 | Genuit et al. | 321/45 R |
| 3,764,887 | 10/1973 | Bingley | 321/20 X |
| 3,846,695 | 11/1974 | Genuit et al. | 321/27 R |

FOREIGN PATENTS OR APPLICATIONS

| 1,304,263 | 8/1962 | France | 321/20 |

Primary Examiner—William M. Shoop, Jr.
Attorney, Agent, or Firm—Herbert W. Arnold; Joseph D. Pannone; Milton D. Bartlett

[57] ABSTRACT

A circuit for coupling the power from the AC output of one inverter to the DC input of another inverter to force the equal, or desired unequal, sharing of the DC supply voltage among series-connected inverters. This circuit provides a solution to the problem presented by solid state inverters operating at frequencies, such as 10 KHz, when used in conjunction with a 600 volt DC supply which is frequently provided by rectification of a 440-volt AC 3-phase power line.

13 Claims, 8 Drawing Figures

893,015

SHEET 2

FORCED VOLTAGE SHARING IN SERIES-CONNECTED POWER INVERTERS

BACKGROUND OF THE INVENTION

This invention relates to inverter power supplies and, more particularly, to DC-to-AC inverters connected in series across a common input source of direct current and provides coupling in a manner to force equal sharing of input voltage even when the individual inverters are operated at different frequencies, phases or loads.

Solid-state inverters are well known and extensively used for converting direct-current power to alternating-current power. However, for operation from relatively high-voltage DC sources, such as 600 volts provided by rectification of a 440-volt AC 3-phase power line, it is desirable to operate two or more inverters in series to maintain a low-voltage stress on the individual inverters. This is because, in typical SCR sine wave inverters, the SCR peak voltage is about twice the inverter DC input voltage. For 300 volts DC input, which is obtained from a 208 volt AC 3-phase power line, the SCR's operate at 600 volts peak. With allowance for line-voltage variations and well known safety factors for reliable operation, 1000 volt SCR's are commonly required in this case. However, for 600 VDC operation, 2000 volt ratings would be required, and such SCR's are not readily available with useful power and high-frequency ratings at reasonable cost. Therefore, series operation of several low-voltage inverters is frequently preferred. However, these prior coupling arrangements usually are limited to the case in which both inverters are operating in phase and at the same frequency. It is therefore an object of the invention to provide an improved inverter supply of the character described, which employs a coupling circuit arrangement to force equal sharing of the source of input voltage to prevent over-stress of individual inverter units even when these individual inverters are delivering different amounts of power to the load. One instance in which this arrangement is used to advantage is when well known vector summing of the output of the individual units is used to regulate the combined AC output voltage. When vector summing of the output of the individual inverters is used to provide a regulated AC output voltage in circuits such as, for example, disclosed in U.S. Pat. No. 3,381,205, issued Apr. 30, 1968 to H. R. Howell et al, unequal power delivered by the vectorally summed outputs of the two inverters results when the load is not purely resistive. In turn, two such inverters when connected in series and loaded unequally during vector summing do not draw equal amounts of power and thus cannot automatically share the input voltage equally. Under some conditions, the division of DC input voltage between the two inverters in series tends to "run away" until one inverter is receiving the full DC input voltage and the other inverter none, so that vector summing, and the intended sharing, becomes impossible. Previous arrangements for forced sharing of input voltage, such as disclosed in U.S. Pat. No. 3,409,818 issued Nov. 5, 1968, to J. D. Gillett or in U.S. Pat. No. 3,373,338 issued Mar. 12, 1968 to P. D. Corey et al, cannot be used in this instance since they employ AC coupling circuits which require that the inverters be in phase with each other.

Accordingly, a further object of the invention is to provide a novel and improved inverter coupling circuit which permits an equal share of the input voltage to be applied to each series-connected inverter even when the inverters are operating out of phase with each other, such as when the aforementioned well-known vector summing method is used to control the output voltage of a plurality of such inverters.

In accordance with one form of the inverter circuit of the invention, a direct current input voltage or source is connected for conversion to alternating current by a pair of conventional series-connected sine wave inverters, each of which utilizes a pair of series-connected inductors connected in series with a corresponding pair of solid-state switching devices, such as silicon controlled rectifiers, each of which in turn is connected to a source of direct current and an inverter capacitor connected in parallel with the common junction of the inductors to form a parallel resonant circuit and to produce across said junction a sine wave output signal. The source of direct current for the series-connected inverters can be obtained by rectifying a conventional three-phase alternating-current power line. The sine wave output of each inverter is taken across its corresponding parallel resonant circuit and is summed and coupled, as by an output transformer, to an alternating current load, or rectified and applied to a direct current load. The conduction of the solid-state switches is programmed by a separate source of gate or switching signals to provide at the output terminals of each inverter a sine wave output which is applied by way of a series capacitor to the primary of the output transformer. These signals are programmed in a well-known manner to provide vector summing of the two inverter outputs in the output transformer. To permit connecting the two inverters in series and to insure that they share the direct current supply voltage equally, a coupling circuit having an input circuit which comprises the primary winding of a coupling transformer is connected across the output of a first one of said vector-summed inverters. The secondary winding of the coupling transformer is connected to a rectifier, such as a bridge rectifier, the direct current output voltage of which is connected across the direct current input of the second vector-summed inverter and poled to supply direct current to the second inverter input. This direct current thus tends to augment the input or source voltage applied to the second inverter.

As the second inverter, for example, becomes more heavily loaded and draws more current than the first inverter, its direct-current input voltage decreases and the direct-current input voltage of the first inverter increases. Since the output voltage of each inverter is proportional to its direct current input voltage, the output voltage of the first inverter increases, and the coupling transformer and the rectifier circuit result in additional power being drawn or sampled from the first inverter by way of the coupling transformer and pumped into the DC input to the second inverter to reduce the net current drawn by that inverter from its direct current voltage input. As the input voltage unbalance increases, more power is pumped from the first inverter to the second inverter until the coupled power is sufficient to result in net equal DC currents being drawn from the input voltage source by the two inverters, and the direct current voltage inputs of the individual inverters then stop changing. The turns ratio of the coupling transformer can be selected in a known manner to determine the amount of voltage unbalance permitted to occur before current starts to be coupled from one inverter to the other. Alternatively, a turns ratio can be selected to force the inverters to supply unequal portions of the summed output voltage.

In its broader sense, the invention contemplates the coupling of power from the alternating current output of one series-connected inverter, rectifying the power coupled to direct current, and feeding the direct current to the input of another series-connected inverter to compensate for any loss of direct current voltage input to said latter inverter resulting from the unbalanced loading of the series-connected inverters.

Series-connected inverters permit the use of available semiconductors in connection with a high input voltage, and the coupling arrangement of the invention forces the DC input voltages to the individual inverters to remain equal or, depending on the coupling ratio, to make the inverters share the DC input voltage at some unequal ratio, even when the inverters are operating out of phase.

In another embodiment, the invention discloses the feature of two coupling circuits cross-coupled so that when the loading on the inverters is such that the input voltage drifts in either direction, the use of these cross-coupled circuits always brings the DC input voltages for the two inverters into the desired balance.

BRIEF DESCRIPTION OF THE DRAWINGS

For a better understanding of the present invention, together with other and further objects thereof, reference is made to the accompanying drawings in which.

DESCRIPTION OF THE PREFERRED EMBODIMENT

Figure 1:
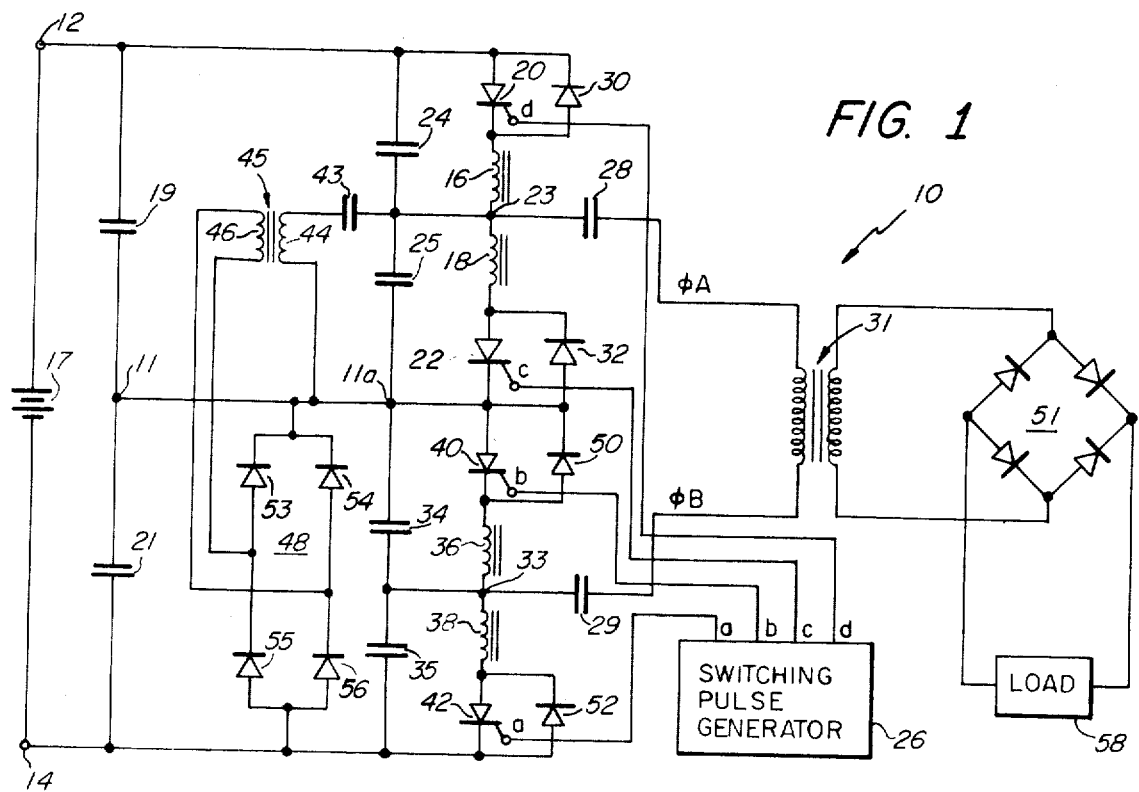
FIG. 1 is a schematic diagram of an inverter power supply circuit embodying features of the invention.
Figure 2:
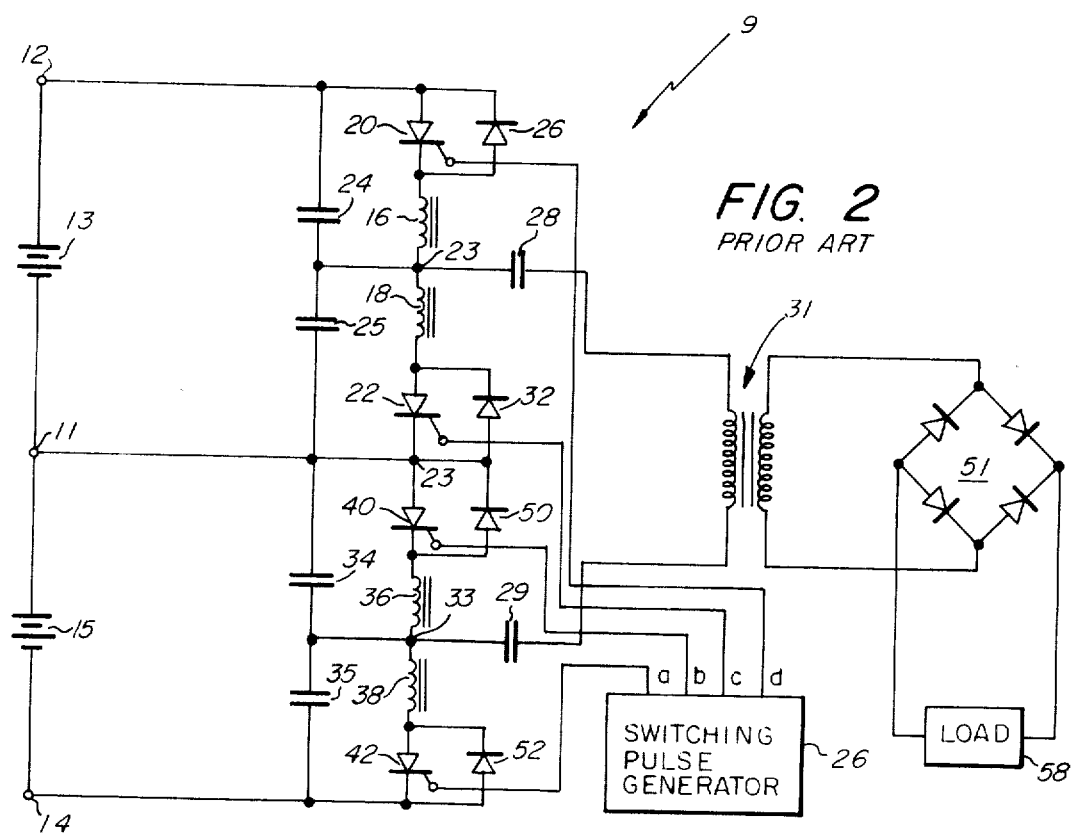
FIG. 2 is a power supply circuit diagram of a pair of prior art type of inverters connected in series and operated in vector-summing fashion to supply a common load.

Referring to FIGS. 1 and 2 and first to FIG. 2, there is shown a diagram of a pair of serially-connected prior art type of inverters, namely the type disclosed in U.S. Pat. No. 3,406,327 issued Oct. 15, 1968 to N. W. Mapham et al.

In FIG. 2, there is shown an inverter power supply 9 having positive and negative input terminals or nodes 12 and 14 adapted to receive an unregulated source of unidirectional current, such as shown by DC energy sources 13 and 15 which are connected in series to supply a single source of direct current to positive input terminal 12 and negative input terminal 14. D.C. energy sources 13 and 15 can be combined into a single independent source by the addition of series connected input capacitors as will be shown and described in connection with FIG. 2. Connected across input terminals 12 and 14 is the inverter circuit portion of the power supply which consists of two series-connected inverters. The first or upper inverter includes inductors 16 and 18 connected in series with two switches in the form of silicon controlled rectifiers, for convenience herein referred to as SCR's. These SCR's can be, for example, type C158. In particular SCR 20 and SCR 22 are connected in series with inductor windings 16 and 18.

A capacitor 24 is connected from the common junction of inductors 16 and 18 to the positive side of DC energy source 13 and capacitor 25 is connected from the common junction of inductors 16 and 18 to the negative side of DC energy source 13. These capacitors form an LC circuit with inductors 16 and 18 when SCR's 20 and 22 are alternately triggered into conduction at for example, a 10-kilohertz rate, by gating pulses from respective output leads d and c from switching pulse generator 26 in a well known manner. In like manner, the lower inverter of the two series-connected inverters includes inductor windings 36 and 38 which are connected in series with SCR's 40 and 42. Capacitors 34 and 35 are connected from the common point of inductors 36 and 38 and are connected respectively to the positive and negative sides of the source 15, to form a LC circuit for the lower inverter. This LC circuit resonates when the SCR's 40 and 42 are alternately triggered into conduction by properly isolated gating pulses on leads b and a from switching pulse generator 26. Two sine-wave outputs are thus obtained at terminals 23 and 33 which are summed across the primary winding of output transformer 31 by way of DC blocking capacitors 28 and 29. The parallel arrangement of capacitors 24 and 25 and capacitors 34 and 35, in connection with their corresponding inductors, presents a constant voltage source to the load in proportion to the DC input voltage to each inverter, and permits stable operation from zero load to full load as described in the aforementioned U.S. Pat. No. 3,406,327. The LC circuits have a value of reactance to resonate, preferably at 1.35 times the trigger rate, this ratio being selected for optimum purity of sine wave output at terminals 23 and 33. Switching pulse generator 26 is programmed in a well known manner to provide gating pulses for the SCR's at this preferred trigger rate.

Also connected across SCR's 20 and 22 and SCR's 40 and 42 are reverse current recovery diodes 30 and 32 and recovery diodes 50 and 52, respectively. After an SCR, such as SCR 20, is triggered, the LC circuit of inductor 16 and capacitors 24 and 25 rings, and the SCR is "turned off" when the current reverses. The reverse current flows toward the power source through the rectifier diode 30, back biasing SCR 20 by its forward drop on alternate half cycles of the output voltage. protection is thus provided for SCR 20 by its associated reverse current diode and, in like manner for the other SCR's by their reverse current diodes, which limit the peak reverse voltage across an SCR to no more than a volt or two. When the load connected to the terminals 23 and 33 is not a pure resistive load, such as when the effects of series capacitors, transformer leakage, and load reactance are included, the real power drawn from each of the two inverters will be unequal. As a result, the two inverters will draw unequal power from their DC sources 13 and 15. Thus, the difference in DC currents drawn by the two inverters flows from node 11. However, when it is desired to use a single high voltage source to supply the voltage across terminals 12 and 14, such as when the circuit is to operate from a 440-volt AC source, as is commonly supplied to equipment requiring more than a few kilowatts of input power, no direct return path is available at node 11. In this case, when the two inverters of FIG. 2 draw unequal current, they do not share an input voltage equally from the single source. Attempts to provide a center tapped high power direct current source requires the use of large and heavy power transformers. Use of an AC power system neutral return to provide a center-tapped DC output is frequently unacceptable because of the high third harmonic ground currents introduced within the power system by such connection which can disturb other loads or the power system itself.

In the embodiment of the invention of FIG. 1 there is shown series-connected capacitors 19 and 21 which are fed by a single DC source 17 and which provide an AC return for the AC currents drawn by the two inverters. However, as can be seen, these capacitors cannot provide a DC return at node 11. Thus, when the two inverters draw unequal DC currents, the voltage at node 11 tends to depart from its intended DC voltage midpoint of source 17. Thus, the DC input voltages to the two inverters become unbalanced, leading to the aforementioned unbalanced and even "run away" operation.

To prevent such unsatisfactory operation of a novel control or coupling circuit for series-connected inverters is shown in FIG. 1. In this case it can be seen that the method of coupling power from the output of one inverter to the input of another inverter can be used even when the two inverters are operating out of phase or even at different frequencies. In particular, in the inverter circuit 10 of FIG. 1 in which corresponding parts in FIGS. 1 and 2 bear the same numbers, the output of the first or upper inverter appearing across capacitor 25, that is across node 23 and node 11a, is coupled by way of a direct current blocking capacitor 43 to primary winding 44 of a coupling transformer 45 which in conjunction with secondary winding 46 provides direct current isolation between the output of the upper inverter and the input to the lower inverter. Also, as understood, the turns ratio of primary 44 and secondary 46 is selected to permit a small percentage of unbalance before current starts to be coupled from the upper to the lower inverter. This ratio can be, for example, approximately 2 to 1, and the leakage inductance of transformer 45 can be chosen in a well known manner to control how much or how little regulation there is in the coupling transformer and its accompanying rectifier circuit 48.

As seen in FIG. 1, rectifier circuit 48 is a conventional full wave type in which diodes 53, 54, 55 and 56 form a full wave bridge to convert the power coupled from the output of the upper inverter to a direct current which is applied across capacitor 21 at the DC input to the lower inverter. It should be readily understood that other types of full wave rectifier can be used, such as for example, the secondary winding 46 of coupling transformer 45 can be provided with a center tap, not shown, from which a lead could extend to node 11 and diodes 53 and 54 are then deleted. Thus, it becomes apparent that in the present embodiment other conventional full wave rectifiers can be used which are poled in a well known manner to rectify to direct current the power coupled from the AC output of the upper inverter and to apply the direct current to the input of the lower inverter at a polarity which augments the input from source 17.

In operation, an inverter output voltage at a high frequency, for example, 10 kilohertz, is provided to output transformer 31 by gating pulses at discrete intervals from a gate or switching pulse generator 26 to the control electrode of each silicon controlled rectifier. The switching voltage for SCR 20, for example, is applied between its cathode and control electrode by means of a conventional isolation transformer, not shown, in the switching pulse generator 26 and having an individual output line d connected to SCR 20. In like manner, silicon controlled rectifiers 22, 40, and 42, respectively, are gated into conduction by gating pulses from respective output lines c, b and a of pulse generator 26 by way of their individual isolation transformers, not shown, in pulse generator 26. It should be understood that other well-known arrangements can be used to provide isolation. The SCR's of each of the inverters are alternately pulsed in a known manner at, for example, a 10 kilohertz rate to convert, for example, 600 volts direct current at terminals 12 and 14 into approximately 400 volts alternating current at 10 kilohertz to the primary of output transformer 31. This AC voltage can be increased or decreased by a transformer and fed directly to a load or, as shown, fed to a conventional full wave diode bridge-rectifier circuit 51, to provide a direct current voltage across load resistor 58.

During alternate triggering of SCR's 20 and 22 of the upper inverter by switching pulse generator 26, its aforementioned LC circuits comprising inductors 16 and 18 and capacitors 24 and 25 ring to provide the 10 kilohertz sine wave output appearing across capacitor 25, which is fed to the primary winding of transformer 31. SCR's 40 and 42 in the lower inverter are likewise triggered to cause the associated LC resonant circuits including capacitors 34 and 35 and inductors 36 and 38, to ring and to provide along with the corresponding upper inverter a pair of sine wave outputs which are vector summed in the primary winding of transformer 31. The parallel resonant circuit arrangement presents a constant voltage source to the load and permits stable operation from zero to full load. However, when one inverter, for example, the lower inverter draws more current than the upper inverter the DC voltage at capacitor 21 at the input to the lower inverter gradually decreases and the voltage to the upper inverter increases. The 10 kilohertz output voltages of the two inverters also decrease and increase, correspondingly. In this instance, coupling transformer 45 and its associated rectifier circuit results in power being drawn from the increased upper inverter AC output voltage and introduced into the decreased DC input of the lower inverter. When this unbalance or drift increases, more power becomes transferred from the upper to the lower inverter until the coupled power is sufficient to result in equal net DC currents for the two inverters and the voltages then stop changing. This forced sharing arrangement thus maintains the capability of the two inverters and their output voltages to become vector summed.

The amount of unbalance which occurs before the coupling arrangement prevents further change in voltages depends upon how much or how little regulation there is in coupling transformer 45, as a result of its resistance and leakage reactance. This transformer 45 and DC blocking capacitor 43 isolate the output of the upper inverter from the input of the lower inverter and also permits flexibility in the choice of coupling ratio. That is, it is not necessarily optimum in performance to force the two DC voltages of the inverters to remain equal; it is sometimes advantageous, from a recovery-time or from a heating standpoint to make the inverters share the DC voltage at some unequal ratio as determined in a well-known manner by the choice of transformer turns ratio and its resistance and reactance. Accordingly, in this manner coupling of power from one inverter to another can be used to force sharing of the DC supply voltage between two series-connected inverters, to permit convenient operation on 440 volt AC systems.

Figure 3:
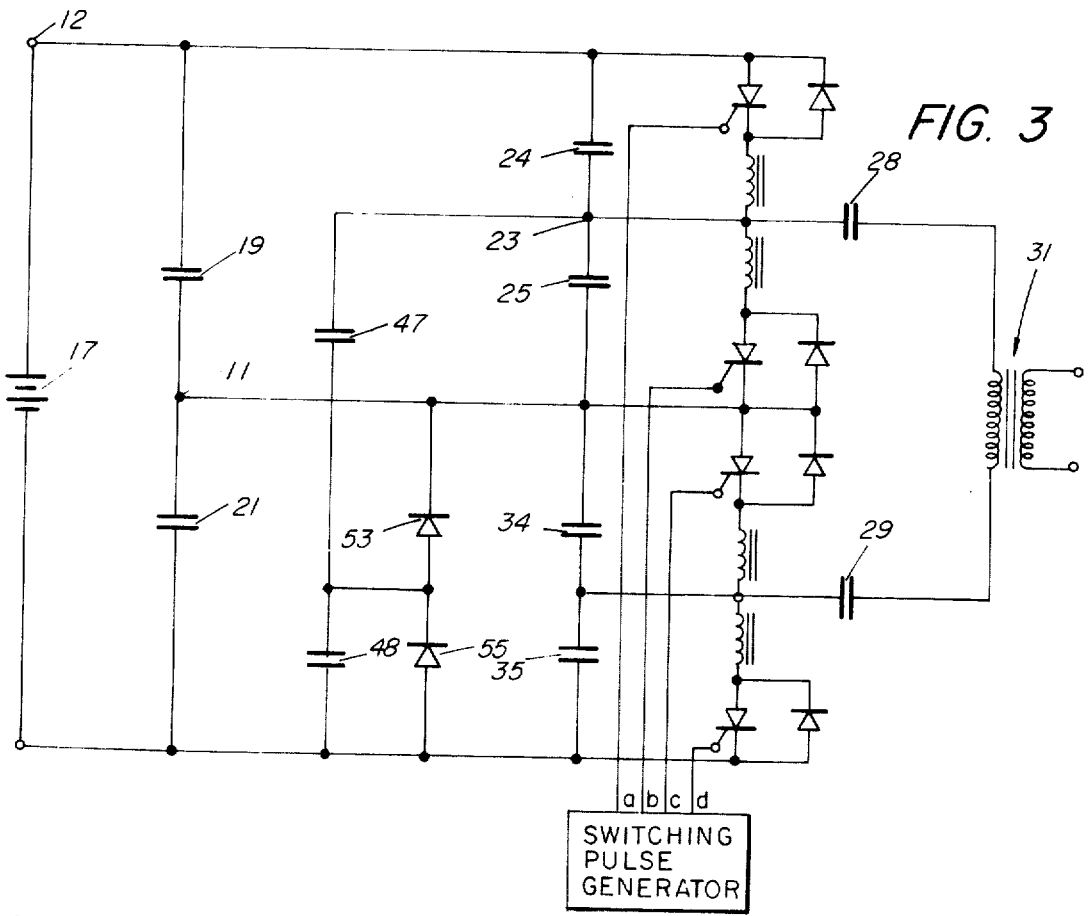
FIG. 3 is a circuit diagram of serially-connected inverters utilizing another form of coupling circuit embodying the invention.

Referring to FIG. 3, there is shown a pair of serially-connected inverters utilizing another form of coupling circuit in which the full wave rectifier 48 and the coupling transformer 45 of FIG. 1 are replaced, respectively, by diode 53 and 55 and by a capacitor 47 connected directly from junction 23 to capacitor 48 and to the common connection of diodes 53 and 55. In this arrangement, the fraction of the full voltage output of the upper inverter supplied to rectifiers 53 and 55 is determined by the ratio of capacitors 47 and 48. The value of this ratio determines the amount of DC voltage unbalance at which power will start to be coupled into the input of the lower inverter. In this case, diodes 53 and 55 operate as voltage doubler diodes. In this instance, capacitor 47 also performs as a direct current blocking capacitor, such as capacitor 43 in FIG. 1, which is required for proper operation of diodes 53 and 55. This additional input power applied to the lower inverter then insures that the lower inverter during vector summing receives its share of input voltage from direct current source 17.

The summed alternating current output of the pair of inverters appears at the output of transformer 31, from which it can be fed directly to a load, not shown, or rectified to direct current, such as shown in the rectifier circuit 51 of FIG. 1 prior to being fed to a load. The turns ratio of the transformer 45 in FIG. 1 or the ratio of capacitors 47 and 48 in FIG. 3 can be selected to permit only a small value of DC unbalance before power starts to flow from the output of one inverter to the input of the other. In addition, the inverter which supplies coupled power to achieve inverter balance can readily do so without significant reduction in the recovery time available to its SCR's since this inverter is more lightly loaded than the other one. Also, there is some flexibility in the choice of the cross-coupling ratio; namely, it is not necessarily optimum to force the two DC inverter voltages to remain equal. It may be advantageous in some instances, from a recovery-time or heating standpoint, to make the inverters share the input DC voltage in some slightly unequal ratio. This can be a fixed ratio, or it can be a varying one as a function of load and vector summing angle by selecting, in known manner, the regulation of the transformer 45 or the values of the capacitors 47 and 48. In this manner, coupling of power from one inverter to another can be used to force sharing of the DC supply voltage between two series connected inverters, to permit convenient operation in conjunction with 440 volt alternating current systems.

Figure 4:
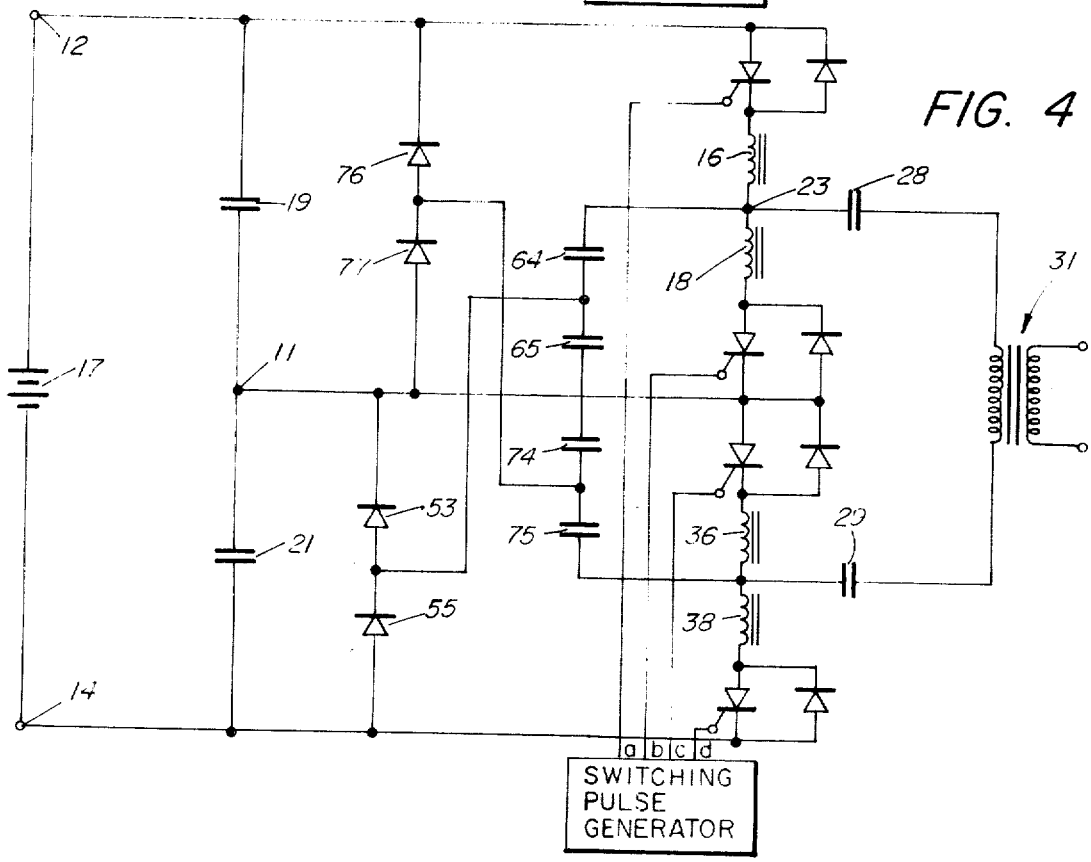
FIG. 4 is a schematic diagram of an inverter power supply having a cross-coupled type of circuit for control of the serially-connected inverters; and, FIG. 5 is a block diagram showing series-connected inverters and another form of cross-coupling circuit for the inverters.

Referring to FIG. 4, there is shown a circuit which operates when the loading on the inverters is such that the voltage can drift from balance in either direction. This is achieved in this embodiment of the invention by cross-coupling two circuits, one from the output of each inverter to the input of the other inverter. However, a minimum number of components is used as seen in FIG. 4, wherein the voltage developed at the common junction of capacitors 64 and 65 is fed directly to the common junction of diodes 53 and 55. It should be noted that capacitors 64 and 65 are now connected in series from node 23 to node 11, so as to operate first, as a resonant tank circuit for the upper inverter; second, as a direct current blocking capacitor in place of capacitor 47 of FIG. 3, and third, as a voltage divider circuit in place of capacitors 47 and 48 of FIG. 3.

In operation, power flows from the output of the upper inverter into the input of the lower inverter to correct for unbalance due to low output voltage from the lower or second inverter. In like manner, capacitors 74 and 75 operate as a resonant tank circuit for the lower inverter, as a DC blocking capacitor for voltage doubler diodes 76 and 77, and as a voltage divider circuit. In this instance, power flows from the common junction of capacitors 74 and 75 at the output of the lower inverter into diodes 76 and 77 at the input of the upper inverter to correct for the unbalance due to lower input voltage to the upper inverter.

The output of the two inverters is summed in the primary of transformer 31, or separate outputs for each inverter feeding separate loads, not shown, can be used. In this latter case, unbalance due to heavier loading of one inverter can thus be compensated by the cross-coupling arrangement, or the values of the coupling capacitors of one inverter can be changed to provide a predetermined unbalance between the upper and lower inverters, such as, for example, when a heavier load is applied to the lower inverter.

Figure 5:
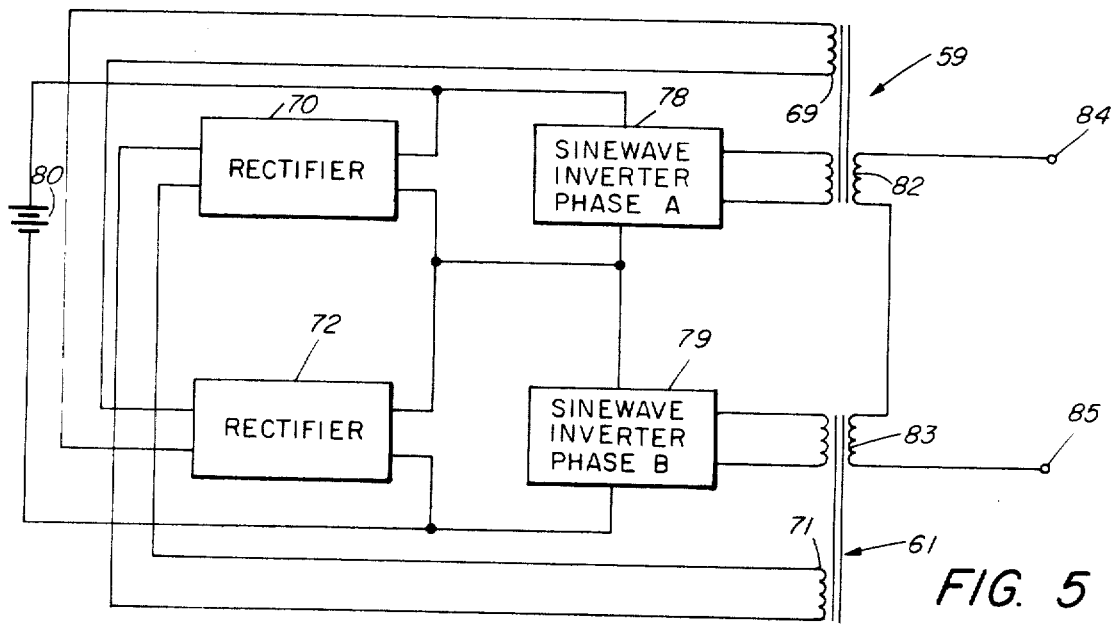

FIG. 5 shows a further embodiment of a series-connected inverter system utilizing two cross-coupled circuits to prevent the voltage output of each inverter from drifting from balance in either direction. In this arrangement separate output transformers 59 and 61 have individual output coupling windings 69 and 71 which are inductively coupled to sample a portion of the output from the upper and lower inverters 78 and 79, respectively, and cross couple these coupling voltages back to the inputs of inverters 79 and 78, respectively, by way of rectifiers 72 and 70 to augment the input voltage from common direct current source 80. In this embodiment, inverters 78 and 79 are well known types of inverters and are switched by a conventional pulse generator, not shown. The turns ratio of the input windings to the corresponding cross-coupling windings is a fixed predetermined value for each output transformer to maintain equal DC input voltages for the two inverters or, alternatively, when desirable, such as to improve inverter recovery time or to limit heating, the inverters can be made to share the DC voltage in an unequal ratio which can be fixed or which can be a function of load and vector summing angle by selecting the amount of regulation in the transformers.

The secondary windings 82 and 83 on transformers 59 and 61, respectively, are connected in series to provide a combined AC output at terminals 84 and 85 which is the vector sum of the two output voltages. Also, in arrangements wherein drifting from unbalance occurs in only one direction, one cross-coupled loop can be omitted such as the winding 71 and rectifier 70. In this instance, it can be seen that the inverter which must supply the coupled power can readily do so without a significant reduction in the recovery time available to the switches, such as SCR's in the inverter, since the inverter which must supply the additional coupled power to the input of the opposite inverter is the one that is more lightly loaded. The turns ratio of the coupling transformer when a single coupling loop is to be used, or of the cross-coupling transformers when the circuit of FIG. 5 is to be used, can be selected to permit very little unbalance before power starts to become cross-coupled and the leakage inductance of each cross-coupling transformer can be chosen to control the tightness of the cross-coupling.

Figure 6:
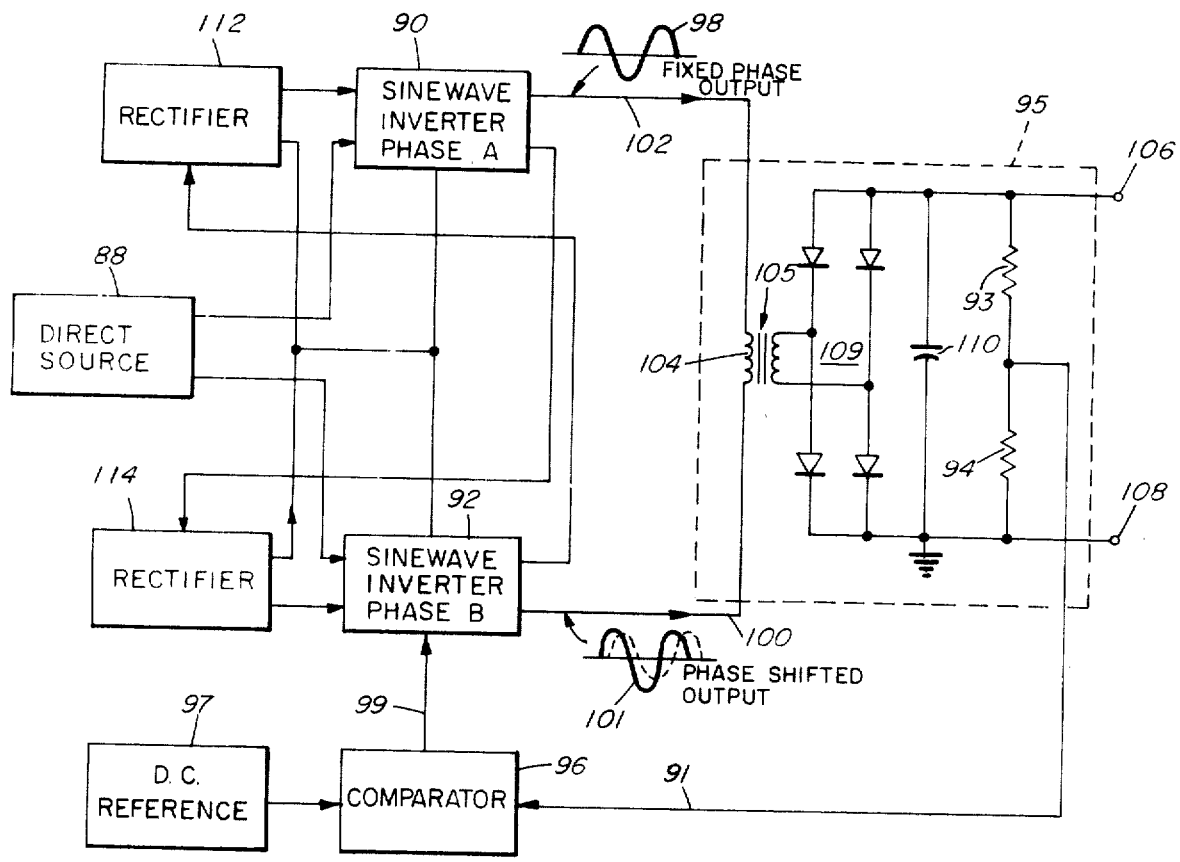
FIG. 6 is a block diagram of a vector summing regulation circuit utilizing the principles of the invention.
Figure 7A:
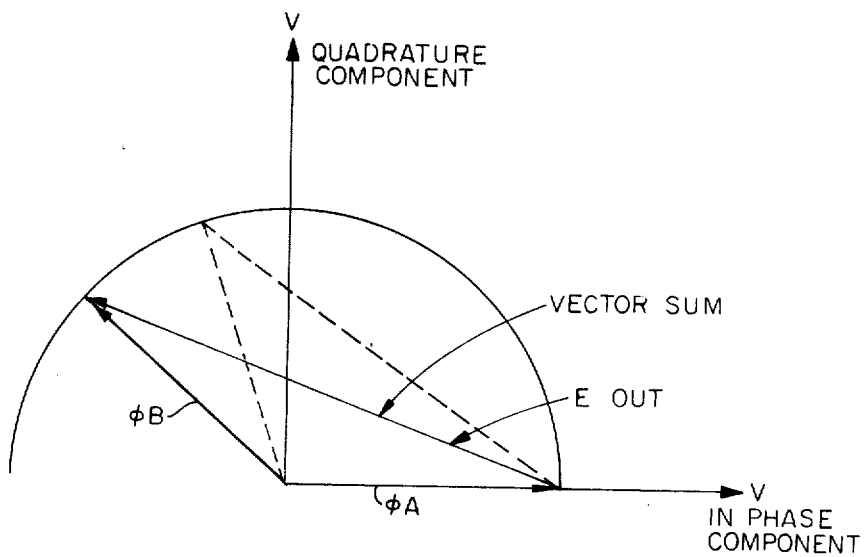
FIG. 7A is a vector diagram showing the vector sum relationship of the circuit of FIG. 6.
Figure 7B:
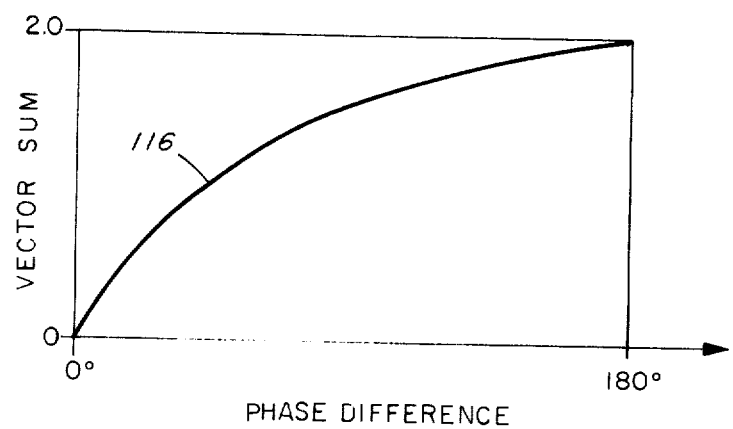
FIG. 7B is a graph showing the variation of vector-sum output voltage versus the phase difference between the inverters.

Referring to FIG. 6, there are shown two sine-wave inverters 90 and 92 operating at 10 kilohertz from a 600 volt direct current source 88. The two inverter outputs are vector summed as shown in FIGS. 7A and 7B and the DC output voltage at terminals 106 and 108 is regulated, by means of obtaining a sample of the rectified output voltage from resistors 93 and 94 in the rectifier output circuit 95. This voltage sample is fed on lead 91 into a conventional comparator circuit 96 where it is compared in a well known manner with DC reference source 97. A phase shift control signal 99 such as a delayed trigger pulse is generated, for example of the type disclosed in U.S. Pat. No. 3,764,887 to Donald W. Bingley, issued Oct. 9, 1973 and assigned to the assignee of this invention and hereby incorporated by reference and made part of this disclosure. In this embodiment, inverter 90 provides a fixed-phase output voltage, as seen at 98, referred to as phase $\phi A$. The phase $\phi B$ of inverter 92 is shifted in response to the phase shift control signal developed by comparator 96 when the voltage sample on lead 91 is compared with the DC reference voltage 97. This phase shift control provides a phase shifted output of sinewave inverter 92 of a phase $\phi B$. This phase shifted output on lead 100, as shown by curve 101, is vectorially added with the fixed sinewave voltage 98 on lead 102. This vector addition occurs in the primary winding 104 of output transformer 105 in the high-voltage rectifier output circuit 95.

In particular, FIG. 7A is a vector diagram showing the AC output voltage of inverter 90 having a phase $\phi A$ combined with the AC output voltage of inverter 92 having a phase $\phi B$ to provide a resultant variable output voltage Eout as the phase relationship of the angle of the two voltages is changed. In FIG. 7B curve 116 shows the change in output amplitude due to vector summing with a change in phase between $\phi A$ and $\phi B$ from 0° to 180°. Eout equals the vector summed output voltage. This holds true for summation of two sine waves of the same frequency as provided by the individual inverters. Thus, when the two sine waves are connected such that their output voltages are vector summed, and when the frequencies of the two are in synchronism, a relative phase shift between the two resuls in a variation of the output, as previously described. The DC reference voltage can be varied to vary the output voltage, in a well known manner, when desired, or utilized as shown to provide regulation of the direct current output voltage at terminals 106 and 108 as provided by full wave rectifier circuit 109 and capacitor 110. When, however, one of the two serially connected inverters tends to draw a heavier current than the other, the cross-coupling circuits, which, for example, are inductively coupled to obtain a portion of the individual inverter output voltages, feed power to rectifiers 112 and 114. The individual direct current outputs of these rectifiers are, in accordance with the invention, applied across the respective DC inputs to the two inverters so as to increase the resultant input voltage to the inverter which draws more current, until the cross-coupled power is sufficient to result, as previously described, in equal net DC currents for the two inverters and the voltages to the inverters will then stop changing. While the cross-coupling circuit as shown in FIG. 6 is advantageous when the loading on the inverters is such that the voltage may drift in either direction, it should be understood that when it is required that the output voltage be prevented from drifting in a single direction, a single coupling circuit can be used of a predetermined tightness or turns ratio to prevent the voltage from drifting from balance in one direction.

This invention is not limited to the particular details of construction, materials and processes described as many equivalents will suggest themselves to those skilled in the art. For example, the coupling circuits disclosed herein may be inductively coupled rather than capacitively coupled, as shown in FIG. 3 for example, and more than two inverters can be connected in series across the input direct current source and additional output taps on the input winding of the output transformer 31 can be utilized to sum the output voltages of the individual inverters. Furthermore, the invention operates as described even when the inverter output voltages are not purely sinusoid 1. Accordingly, it is desired that this invention not be limited to the particular details of the embodiments disclosed except as defined by the appended claims.

I claim:

1. In combination, a source of direct current, first and second inverters, each inverter having a DC input and an AC output, said inverters connected in series with each other and said source of direct current, means for providing a sample of the AC output of one of said inverters, means for rectifying said sample to a direct current output, and means for feeding said direct current output to augment the DC input of the other inverter when the DC input of one inverter departs from a predetermined balance with respect to the other.

2. In combination, a source of direct current, first and second sine wave inverters coupled in series with each other and including serial-connected inductor windings connected by way of switching means to said source of direct current, a capacitor connector to form a parallel resonant circuit with each of said inductor windings, means including a transformer having a primary winding coupled to the output of each serially connected inverter and a secondary winding coupled to an output circuit, means for sampling the alternating current output of said first inverter, means for rectifying said sampled alternating current to a direct current and feeding said direct current to the input of said second inverter, thereby to substantially balance the input voltages from said source of direct current to said first and second inverters.

3. An inverter power supply comprising a source of direct current, first and second inverters, said inverters having a DC input and an AC output, said inverters connected in series with each other and said source of direct current, capacitor means connected to the output of said first inverter, a pair of serially-connected diodes connected across the input of said second inverter, said capacitor means connected to feed its output to the common junction of said first and second diodes, thereby to substantially balance the input voltages from said direct current source to said first and second inverters.

4. An inverter power supply comprising a direct current source, switching means, first and second sine wave inverters coupled in series with each other by way of said switching means to said source of direct current, a pair of series capacitors connected to form a parallel resonant circuit with each of said sine wave inverters and connected in series with each other to form an output circuit, means connected to the output of each series-connected inverter and adapted to provide an output which is the vector sum of said first and second sine wave inverters, a pair of serially connected diodes coupled respectively across the input of each of said first and second sine wave inverters, and coupling means cross-coupled from the common junction of each of the pairs of said series capacitors to the common junction, respectively, of each other pair of serially connected diodes to balance the input voltages from said direct current source to said first and second sine wave inverters irrespective of the direction of unbalance of the input voltage to either of said first and second sine wave inverters.

5. In combination; a source of direct current, first and second inverters, each inverter having a DC input and an AC output, the inputs of said first and second inverters connected in series with each other and said source of direct current, means for sampling the AC output of said first and second inverters, means for rectifying the AC output of each sample, and means for feeding the rectified sampled output of said second inverter to the input of said first inverter and the rectified sampled output of said first inverter to the input of said second inverter, thereby to augment the DC input of either of said inverters to maintain the input voltages of said first and second inverters substantially in balance.

6. An inverter power supply comprising a source of direct current, first and second sine wave inverters coupled in series with each other and said source of direct current, each inverter having a DC input and an AC output, means for providing a sample output of the AC output of each of said inverters, means for rectifying each sample output to provide a direct current, means for applying the direct current from the output of the first of said sine wave inverters to the input of the second of said sine wave inverters and means for applying the direct current from the output of the second of said sine wave inverters to the input of the first of said sine wave inverters, an output circuit coupled to said first and second sine wave inverters and adpated to provide an output which is the vector sum of said first and second sine wave inverters, means for sampling said output, means for comparing said sampled output with a reference source to provide a difference control signal, and means in response to said control signal to alter the phase of one sine wave inverter with respect to the other to control the output of said inverters.

7. An inverter power supply comprising a source of direct current, switching means, first and second sine wave inverters having inductor windings coupled in series with each other by way of said switching means and said source of direct current, a capacitor connected to form a parallel resonant circuit with said inductor windings, means for coupling the output of said first and second sine wave inverters to an output circuit providing a resultant output voltage, means for rectifying said output voltage, means for comparing said rectified output voltage with a reference source to provide a control signal, means in response to said control signal to delay the triggering into conduction of said switching means of said inverter to maintain the amplitude of said resultant output voltage substantially constant, means for providing a sample of the output of one of said sine wave inverters, means for rectifying said sample to provide a direct current, and means for applying the rectified direct current to augment the input voltage of the other of said sine wave inverters to maintain in balance said soruce of direct current to said first and second sine wave inverters.

8. The inverter power supply as set forth in claim 7 in which the switching means comprises SCR's.

9. The combination as set forth in claim 2 in which said switching means includes a diode connected in shunt with said switching means and poled in a direction to provide a voltage drop adapted to back bias said switching means on alternate half cycles of operation of said switching means.

10. The combination as set forth in claim 1 in which additional means is provided for obtaining another sample of the output of the other of said inverters, means for rectifying said other sample to another direct current output, and means for feeding said other rectified direct current output to the input of said first inverter to augment its DC input for maintaining substantially in balance the source of direct current to said first and second inverters.

11. An inverter power supply comprising, a source of direct current, first and second inverters, each inverter having a DC input and an AC output, said inverters connected in series with each other and said source of direct current, means for coupling the output of said first and second inverters to an output circuit to provide a resultant output voltage, means for providing a sample of the AC output of one of said inverters, means for rectifying said sample to a direct current output, means for feeding said direct current output to the DC input of the other of said inverters, means for comparing the resultant output voltage with a reference voltage to provide a control signal, and means in response to said control signal to alter the phase of one of said inverters with respect to the phase of the other to vary the resultant output voltage.

12. The inverter power supply as set forth in claim 11 in which each of said inverters includes switching means connected in series with said source of direct current, and means for triggering said switching means of said first inverter into conduction at predetermined times with respect to the triggering into conduction of said second inverter.

13. In combination, a source of direct current, first and second inverters, said inverters having a DC input and an AC output, said inverters connected in series with each other and said source of direct current, transformer coupling means connected to the output of said first inverter, a rectifier circuit having its output connected across the input of said second inverter, said transformer coupling means connected to feed its output to the input of said rectifier circuit, thereby to substantially balance the input voltages from said direct current source to said first and second inverters.

* * * * *